(12) United States Patent
Marshall

(10) Patent No.: US 11,320,239 B2
(45) Date of Patent: May 3, 2022

(54) COMPACT PRISMATIC OPTICAL SIGHT WITH INTERNAL ZEROING METHOD

(71) Applicant: RAYTHEON CANADA LTD.—ELCAN, Ottawa (CA)

(72) Inventor: Gregory Mark Marshall, Orleans (CA)

(73) Assignee: RAYTHEON CANADA LTD.—ELCAN, Ottawa (CA)

( * ) Notice: Subject to any disclaimer, the term of this patent is extended or adjusted under 35 U.S.C. 154(b) by 138 days.

(21) Appl. No.: 16/688,735

(22) Filed: Nov. 19, 2019

(65) Prior Publication Data
US 2021/0148674 A1    May 20, 2021

(51) Int. Cl.
| | | |
|---|---|---|
| G02B 5/04 | (2006.01) | |
| F41G 1/38 | (2006.01) | |
| G02B 23/02 | (2006.01) | |
| F41G 1/14 | (2006.01) | |
| F41G 1/16 | (2006.01) | |
| F41G 1/30 | (2006.01) | |

(52) U.S. Cl.
CPC ............ *F41G 1/14* (2013.01); *F41G 1/16* (2013.01); *F41G 1/30* (2013.01); *F41G 1/38* (2013.01); *G02B 5/04* (2013.01); *G02B 23/02* (2013.01)

(58) Field of Classification Search
None
See application file for complete search history.

(56) References Cited

U.S. PATENT DOCUMENTS

| | | | |
|---|---|---|---|
| 4,408,842 A | 10/1983 | Gibson | |
| 4,806,007 A | 2/1989 | Bindon | |
| 7,440,185 B1 | 10/2008 | Thorpe et al. | |
| 7,827,723 B1 | 11/2010 | Zaderey et al. | |
| 8,254,746 B2 | 8/2012 | Schick et al. | |
| 9,494,787 B1 * | 11/2016 | Bagwell | F41G 1/38 |
| 10,429,150 B1 * | 10/2019 | Thomas | G02B 17/045 |
| 2009/0002856 A1 | 1/2009 | Thorpe et al. | |
| 2011/0043928 A1 | 2/2011 | Rozitis et al. | |

FOREIGN PATENT DOCUMENTS

CN    201819622 U    5/2011

OTHER PUBLICATIONS

International Search Report and Written Opinion in International Patent Application No. PCT/CA2020/000109 dated Dec. 10, 2020.

* cited by examiner

*Primary Examiner* — Derek S. Chapel
(74) *Attorney, Agent, or Firm* — Lando & Anastasi, LLP

(57) ABSTRACT

An optical system includes an aperture stop configured to direct light through the optical system, an inverting prism assembly configured to receive light from the aperture stop and direct light through the optical system, and a field stop configured to receive light from the inverting prism assembly and direct light through the optical system to an operator of the optical system. A point-of-impact is identified in object space and a point-of-aim is identified in afocal space of the optical system. The inverting prism assembly is configured to be pivoted about a center of the aperture stop to effect alignment of the point-of-impact and point-of-aim in the afocal space so that the point-of-aim is coincident with the optical axis.

13 Claims, 4 Drawing Sheets

COMPACT PRISMATIC OPTICAL SIGHT WITH INTERNAL ZEROING METHOD

GOVERNMENT RIGHTS

Not applicable.

BACKGROUND OF THE INVENTION

Embodiments of the present disclosure are generally directed to accessories that are used on weapons, such as sight magnifiers used on firearms, and more particularly to a compact prismatic optical sight assembly with internal zeroing method.

Firearms are frequently outfitted with accessories, such as scopes, electronic sights, magnifying devices, and night vision devices. These types of accessories are typically mounted on the firearm.

Boresight zeroing establishes an azimuth (windage) and an elevation of an optical sighting device that is required to align the point-of-impact of a weapon system with the point-of-aim of the sighting device. External zeroing refers to a mechanical means, external to the optics of the optical sighting device, of achieving the required alignment by tilting the longitudinal, or optical axis of the optical sight. Internal zeroing refers to the movement of one or more optical elements internal to the optical sighting device in order to achieve the required alignment, typically by scanning a field-of-view relative to a reticle pattern located at the focal plane of the objective. In one known approach, the optical sighting device has an image inverting prism that is configured to tilt the prism about the focal plane of the objective to achieve zeroing. Alternatively, the optical sighting device incorporates an image inverting lens group by tilting the lens group to achieve zeroing. Another approach specifies tilting of an optical train following an objective lens about a nodal point of the objective to achieve zeroing. Yet another approach requires tilting or displacement of the objective lens. In summary, prior solutions achieve boresight zeroing by the tilting or displacement of an optical element or group of elements internal to the sight or by tilting the optical axis of the sight by external means.

SUMMARY OF INVENTION

One aspect of the present disclosure is directed to an optical system comprising an aperture stop configured to direct light through the optical system, an inverting prism assembly configured to receive light from the aperture stop and direct light through the optical system, and a field stop configured to receive light from the inverting prism assembly and direct light through the optical system to an operator of the optical system. A point-of-impact is identified in object space and a point-of-aim is identified in afocal space of the optical system. The inverting prism assembly is configured to be pivoted about a center of the aperture stop to effect alignment of the point-of-impact and point-of-aim in the afocal space so that the point-of-aim is coincident with the optical axis.

Embodiments of the optical system further may include at least one first lens configured to receive light from an object and direct light through the aperture stop and to the inverting prism assembly. The at least one first lens further may include an entrance lens positioned in front of the aperture stop and a lens positioned behind the aperture stop. The optical system further may include at least one second lens configured to receive light from the field stop and direct light to the operator of the optical system. The at least one second lens may include an eyepiece lens positioned behind the field stop. The optical system further may include a support housing configured to support the aperture stop, the at least one first lens, the inverting prism assembly, the field stop, and the at least one second lens. The optical system further may include a mechanism configured to move the inverting prism assembly. The mechanism may include a prism mount cell having surfaces configured to engage surfaces of the inverting prism assembly. The prism mount cell may be configured to rotate with respect to the housing. The mechanism further may include a front rotation actuator and a rear rotation actuator to move the inverting prism assembly about a rotation point located at the aperture stop. The inverting prism assembly may include two prisms separated by an air gap. The support housing may include a generally cylindrical structure.

Another aspect of the disclosure is directed to a method of aligning a point-of-impact and a point-of-aim of an optical system. In one embodiment, the method comprises: directing light through an aperture stop; directing light from the aperture stop to an inverting prism assembly; directing light from the inverting prism assembly through a field stop configured to direct light to an operator of the optical system; and pivoting the inverting prism assembly about a center of the aperture stop to effect alignment of the point-of-impact and point-of-aim in the afocal space so that the point-of-aim is coincident with the optical axis.

Embodiments of the method further may include identifying a point-of-impact in object space and a point-of-aim in afocal space of the optical system. The method further may include directing light from an object through the aperture stop and to the inverting prism assembly. The method further may include directing light from the field stop to the operator of the optical system. Pivoting the inverting prism assembly may be achieved by a mechanism configured to move the inverting prism assembly. The mechanism may include a prism mount cell having surfaces configured to engage surfaces of the inverting prism assembly. The prism mount cell may be configured to rotate with respect to the housing. The mechanism further may include a front rotation actuator and a rear rotation actuator to move the inverting prism assembly about a rotation point located at the aperture stop.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Figure 1:
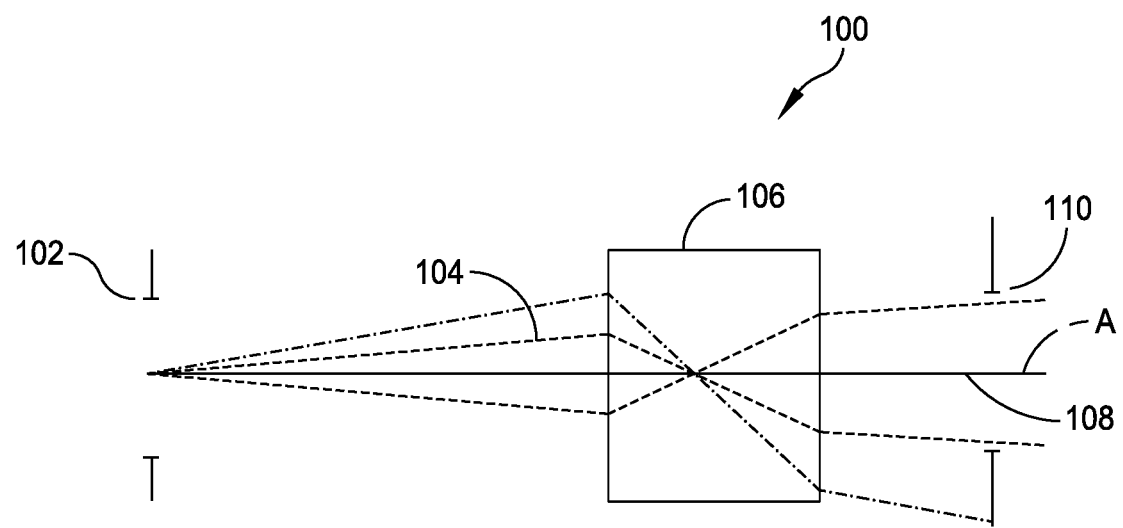
FIG. 1 is a schematic view of an optical system of an embodiment of the present disclosure showing an inverting prism in a neutral position.

Embodiments of the present disclosure are directed to accessories configured to mount on a firearm. Accessories include, but are not limited to, scopes, iron sights, tactical lights, laser aiming modules, night vision devices, reflex sights, foregrips, bipods, slings and bayonets. Currently, accessory magnifiers and similar optical devices are used to enhance the shooter's ability to observe and engage targets at distances that unmagnified sights could not otherwise be used. These optical devices introduce issues associated to their use.

Embodiments of the optical system disclosed herein are directed to an optical design of an optical sighting device having an internal prismatic boresight zeroing mechanism. The optical system minimizes a mechanical length and a diameter of the optical sighting device, while maintaining optical performance. A mechanism to zero the optical sighting device is supported so that the mechanism 1) does not displace the exit pupil from the optical axis thereby stabilizing an operator's eye position relative to the sight, 2) minimizes a clear aperture required to accommodate variation in the field-of-view without optical vignetting, and 3) affords flexibility in the axial position of the image inverting prism.

For example, in rifle shooting, consistent accuracy requires the operator to maintain a consistent cheek weld, i.e., a consistent position of a shooter's face on a rifle stock and, consequently, the shooter's eye with respect to an exit pupil. It is desirable that the exit pupil remain fixed under zeroing adjustment so as to maintain the cheek weld and eye position. Prism or lens group adjustment by means other than that proposed herein produce an angular displacement of the light rays in the imaging space between objective and eyepiece lenses resulting in a linear displacement of the aperture stop conjugate, which defines the exit pupil. This displacement is lateral or transverse with respect to the boresight, and can be in excess of 2 or 3 millimeters, which is a significant fraction of the exit pupil size, depending on the sight's magnification factor. It should be noted that the method of external zeroing displaces the exit pupil similarly, as external zeroing rotates the entire sight mechanically about tilt axes that are longitudinally displaced from the exit pupil location.

Angular displacement of light rays in an imaging space results in a linear, transverse displacement of the light ray bundle on clear apertures of eyepiece lenses. Consequently, the clear apertures of the eyepiece lenses must be large enough to accommodate this displacement. Otherwise, some light rays may be physically stopped beyond the clear apertures, which is a phenomenon called vignetting. Vignetting results in variation of the brightness observed by the operator across his field-of-view and is undesirable. Boresight zeroing by means other than that proposed herein can result in vignetting in excess of 20%. In order to accommodate light ray bundle displacement without vignetting of this magnitude, the clear aperture diameter is increased by at least 32%. This may significantly increase the mass of the lens and increase the radial footprint presented to the shooter. A design trade-off is then be made among the various limitations.

The requirement that the image inverting prism be positioned at the focal plane of the objective, in such designs that specify prism rotation about the focal plane for the purpose of boresight zeroing, introduces a design constraint on the axial position of the prism. More specifically, designs that incorporate a reticle pattern or field stop on one reflecting face of the image inverting prism are axially constrained by virtue of having to make the reticle plane coincident with the focal plane of the objective. It is desirable to have flexibility in the axial position of the prism for the purpose of accommodating other functional elements, for example, and minimizing the size of the prism in consideration of the light path through the prism including the light rays' footprints on the prism's reflecting surfaces and how they change as a function of the imposed zeroing adjustment.

As mentioned above, prior solutions achieve boresight zeroing by the tilting or displacement of an optical element, group of optical elements, or the sight itself. These solutions are limited by one or more of the above stated problems, which arise consequentially.

Figure 2:
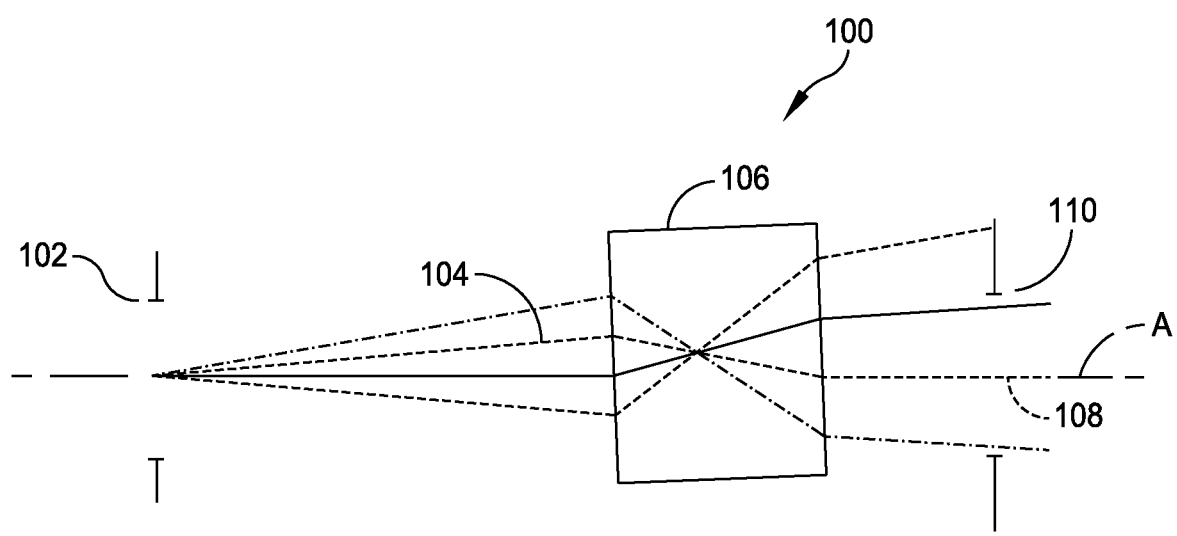
FIG. 2 is a schematic view of the optical system of FIG. 1 showing the inverting prism pivoted about a center of an aperture stop.

The optical design and zeroing mechanism disclosed herein solves the above-stated problems by pivoting an image inverting prism about a point coincident with the location of the aperture stop on the optical axis. This concept is simplified in the optically reduced (air equivalent model) as illustrated in FIGS. 1 and 2. As shown, an optical system is generally indicated at 100 that extends along an optical axis A. Light enters the optical system 100 through an aperture stop 102 along a plurality of field angles, including the point-of-impact 104. The light subsequently enters an inverting prism 106, is manipulated by the inverting prism 106, and propagates toward a field stop 110. In one embodiment, the simplified model incorporates a generalized, mathematically equivalent image inverting prism 106, i.e., the optical rays are traced through the inverting prism 106 such that the ray displacements and angles relative to the optical axis A are inverted in sign. Such ray transformations are commonly treated mathematically in matrix-based linear algebra formulations and can be modelled by optical design software.

In an optical system, the primary, or chief rays of the respective field angles are aimed at the center of the entrance pupil and trace through the center of the aperture stop. In FIG. 1, the lines represent the chief rays, which trace from the center of the aperture stop 102, through the image inverting prism 106, and on to the field stop 110. The solid line shown in FIG. 1 represents the field angle coincident with the optical axis A and a point-of-aim 108, the dashed lines represent the field-of-view limits, and the dash-dot line represents a field angle terminated at the field stop 110. FIG. 1 is an illustrative example of extreme point-of-aim/point-of-impact misalignment; the point-of-impact 104 resides at the edge of the field-of-view, whereas, the point-of-aim 108 resides on the optical axis A coincident with a reticle pattern located at the center of the field stop 110.

In embodiments of the present disclosure, the image inverting prism 106 is pivoted about the center of the aperture stop 102 in order to effect boresight zeroing, as illustrated in FIG. 2. As a result of the described pivoting, the chief rays are shifted in angle as they approach the field stop 110, the effect of which is to scan the field angles across the field stop bringing the point-of-impact 104 into alignment with the point-of-aim 108 in such a manner that both field angles are coincident with optical axis A.

Figure 3:
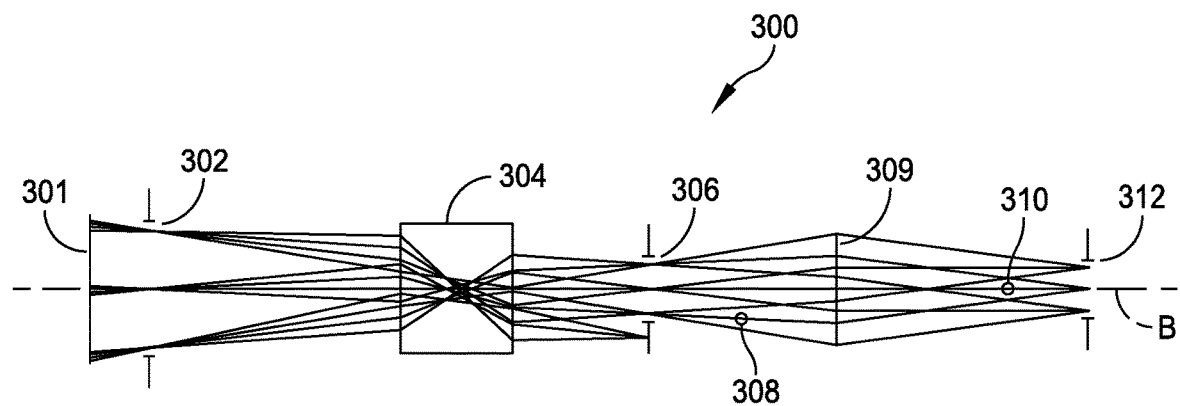
FIG. 3 is a schematic view of an optical system of another embodiment of the present disclosure showing an inverting prism in a neutral position.
Figure 4:
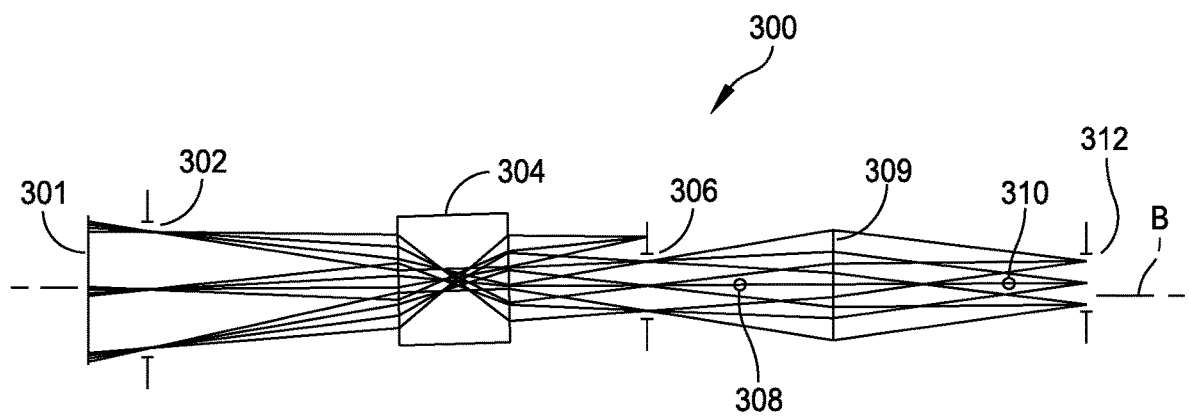
FIG. 4 is a schematic view of the optical system of FIG. 3 showing the inverting prism pivoted about a center of an aperture stop.

Referring to FIGS. 3 and 4, an optical system is generally indicated at 300 that extends along an optical axis B. FIGS. 3 and 4 show a conceptual representation of the proposed zeroing method in an afocal optical design that has been exaggerated for illustration and simplified with paraxial lenses representing an objective lens 301 and an eyepiece lens 309, respectively. Light reflected from an object enters the optical system 300 along a plurality of field angles through the objective lens 301 and an aperture stop 302. Light from the aperture stop 302 enters an inverting prism 304, is manipulated by the inverting prism 304, and propagates toward a field stop 306. Light from the field stop 306, including the chief ray representing the point-of-impact 308, propagates through an eyepiece lens 309, which collimates the light of the respective field angles toward an exit pupil 312. FIG. 3 corresponds to the nominal configuration illustrated in FIG. 1. FIG. 4 illustrates the case, represented in FIG. 2, where pivoting of the image inverting prism 304 about the center of the aperture stop 302 effects the required boresight zeroing correction.

In FIGS. 3 and 4, the rays include the primary, or chief rays and the secondary, or marginal rays, the latter of which are aimed at the limit of the entrance pupil (not shown) and, following the objective lens 301, pass through the limits of the aperture stop 302. Four field angles are represented. The aperture stop 302 is imaged by the eyepiece lens 309 at the exit pupil 312, which is marked by the convergence of the chief and marginal rays, respectfully. The exit pupil 312 is the location where an operator places an eye to view a magnified, virtual image of the downrange object. The field stop 306 is located at an imaging plane of the objective lens 301 where a reticle pattern may be placed. The center of the reticle pattern resides at the center of the operator's field-of-view and defines the field angle associated with the point-of-aim 310. It should be noted that the optical system of the sighting device may or may not include a fixed reticle. In an alternative arrangement, a virtual reticle pattern may be received by the sighting device by means of an external illuminating device (e.g., a reflex sight), whereupon, the point-of-impact and point-of-aim have been separately and previously aligned. In this case, the described pivoting of the image inverting prism serves to center the co-aligned point-of-impact and point-of-aim within the operator's field-of-view.

In FIG. 3, the indicated chief rays associated with the field angles of the point-of-impact 308 and the point-of-aim 310 are not coincident in the afocal space of the eyepiece lens 309, i.e., the sight is not correct for boresight within the apparent field-of-view observed by the operator. In FIG. 4, following the described pivoting method, the field angles associated with the external scene, and image points thereof, are scanned across the field stop 306 and, consequently, the point-of-impact 308 is made coincident with the point-of-aim 310 resulting in the required boresight alignment. With this adjustment, the reticle pattern remains fixed at the center of the operator's field-of-view. Where a virtual reticle is employed, the described boresight zeroing method serves to align the point-of-aim 310, which is apparently fixed within the observed external scene, with the center of the operator's field-of-view. In all cases, it desirable to have the point-of-aim 310 centered within the operator's field-of-view to avoid eye strain associated with any such offset.

In addressing issues with prior optical systems, the proposed solution is advantageous over known solutions. Pivoting the inverting prism 304 in the manner described aligns the point-of-impact 308 with the point-of-aim 310 in such a way as to maintain coincidence between the point-of-aim 310 and the optical axis B. Consequently, the exit pupil 312 is not laterally displaced from the optical axis B. Moreover, the field-of-view is scanned across the field stop 306 without displacement of the light bundle on the eyepiece lens 309. Consequently, a clear aperture of the eyepiece is precisely maintained without vignetting. It follows that the lack of vignetting affords the optical system 300 to operate with a minimum eyepiece diameter reducing both the radial footprint to the operator and mass of the sighting device.

In FIGS. 3 and 4, the inverting prism 304 is free to be positioned anywhere between the aperture stop 302 and the field stop 306 subject to an increase in the required correcting tilt angle as the inverting prism 304 approaches the aperture stop 302 and subject to having a reticle external to the inverting prism 304. A practical upper limit to the tilt angle imposed by the proposed zeroing adjustment is the field-of-view accepted by the inverting prism 304 in order for its surfaces to function under conditions of total internal reflection as is typically required.

In view of the above, and the removal of such compromises to be made, a possible corollary benefit is an increase to the effective range of the zeroing adjustment that the proposed method can afford.

The requirement that the pivot point be precisely coincident with the aperture stop 302 arises strictly in the optically reduced (air equivalent) prism model as detailed in FIGS. 1-4. In a real optical design with an image inverting prism fabricated from glass, the ideal prism pivot point may be at an axial location different than the aperture stop, as one must account for the prism's refractive index. In general, the pivot location and aperture stop location have a fixed distance relationship in the proposed boresighting method, e.g., they will maintain a constant separation as a function of aperture stop position. The location of the ideal prism pivot point will be generally located proximate to the aperture stop; however, it is not precisely constrained in this regard.

In one design configuration, refractive index compensatory mechanisms vis à vis use of a telephoto objective place the pivot point precisely at the aperture stop location for all practical purposes. A telephoto lens arrangement comprising a positive powered lens element followed by a negative powered lens element is used to shorten the mechanical length of the objective to focal plane distance and is consistent with the present specification to describe a compact optical design.

Figure 5:
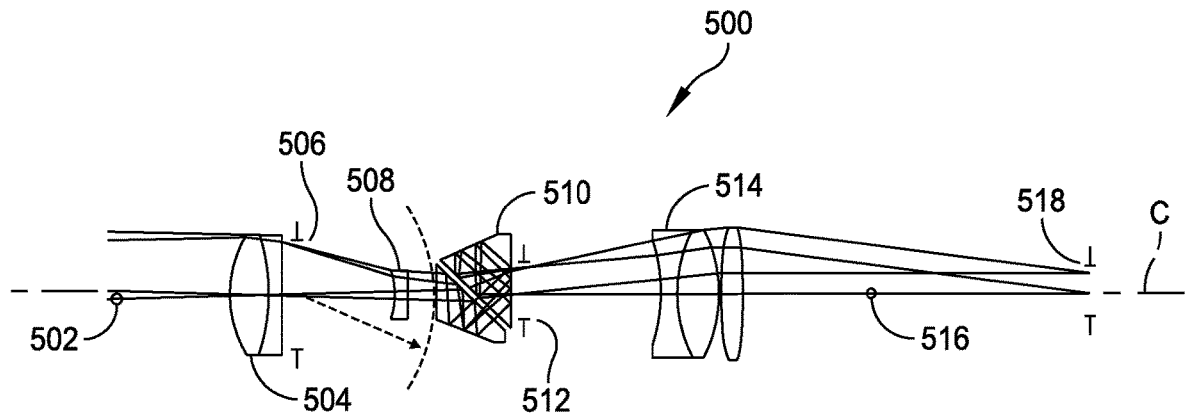
FIG. 5 is a schematic view of an optical system of another embodiment of the present disclosure.

FIG. 5 illustrates an optical layout in a telephoto configuration that is corrected for a 1° boresight error, for example. As shown, an optical system is generally indicated at 500 along an optical axis C. Light reflected from an object enters the optical system 500 along a plurality of field angles, including the point-of-impact 502 with a 1° offset from the optical axis, through an objective lens assembly 504 configured to direct the light through an aperture stop 506. Light from the aperture stop 506 enters through another lens 508 to an image inverting prism assembly 510, is manipulated by the prism assembly 510, and propagates toward a field stop 512. Light from the field stop 512 propagates through an eyepiece lens assembly 514, which collimates the light of the respective field angles toward an exit pupil 518.

The marginal and chief rays for each of two field angles are shown. The field angles correspond to the point-of-impact 502 and edge of the field-of-view, respectively. The chief ray associated with the point-of-impact 502 is identified in the object space, whereas, the chief ray of the point-of-aim 516 is identified in the afocal space of the eyepiece. The lenses, stops, and pupil positions follow according to their descriptions in FIGS. 3 and 4. The form of a telephoto objective, e.g., a Schmidt-Pechan type image inverting prism, and eyepiece designs are familiar to those practiced in the art. As known, the Schmidt-Pechan prism is configured to invert an image, i.e., rotate an image 180°. The Schmidt-Pechan prism embodies two prisms separated by an air gap. The design of the two prisms enables an entrance beam and an exit beam to be coaxial.

In FIG. 5, the inverting prism assembly 510 is pivoted about a center of the aperture stop 506 to effect alignment of the point-of-impact 502 and point-of-aim 516 in the afocal space of the eyepiece such that the point-of-aim is coincident with the optical axis C. The dashed lines indicate a location and radius of curvature about which the image inverting prism assembly 510 pivots. Similarly, pivoting in the transverse direction is required to correct for boresight errors in the orthogonal plane.

It is desired that the boresight error correction be linear in response to the boresight adjustment over its operating range. The described pivoting method is precisely linear in this regard. Furthermore, it is desired that the optical performance associated with the observed point-of-impact 502 be maintained following boresight zeroing adjustment.

It should be noted that a method of aligning a point-of-impact 502 and a point-of-aim 516 of the optical system 500 includes directing light through the aperture stop 506, directing light from the aperture stop 506 to the inverting prism assembly 510, directing light from the inverting prism assembly 510 through the field stop 512 configured to direct light to an operator of the optical system 500, and pivoting the inverting prism assembly 510 about the center of the aperture stop 506 to effect alignment of the point-of-impact 502 and point-of-aim 516 in the afocal space. As shown, with reference to FIG. 5, light is directed from the object through the aperture stop 506 and to the inverting prism assembly 510 and light is directed from the field stop 512 to the operator of the optical system 500.

Figure 6:
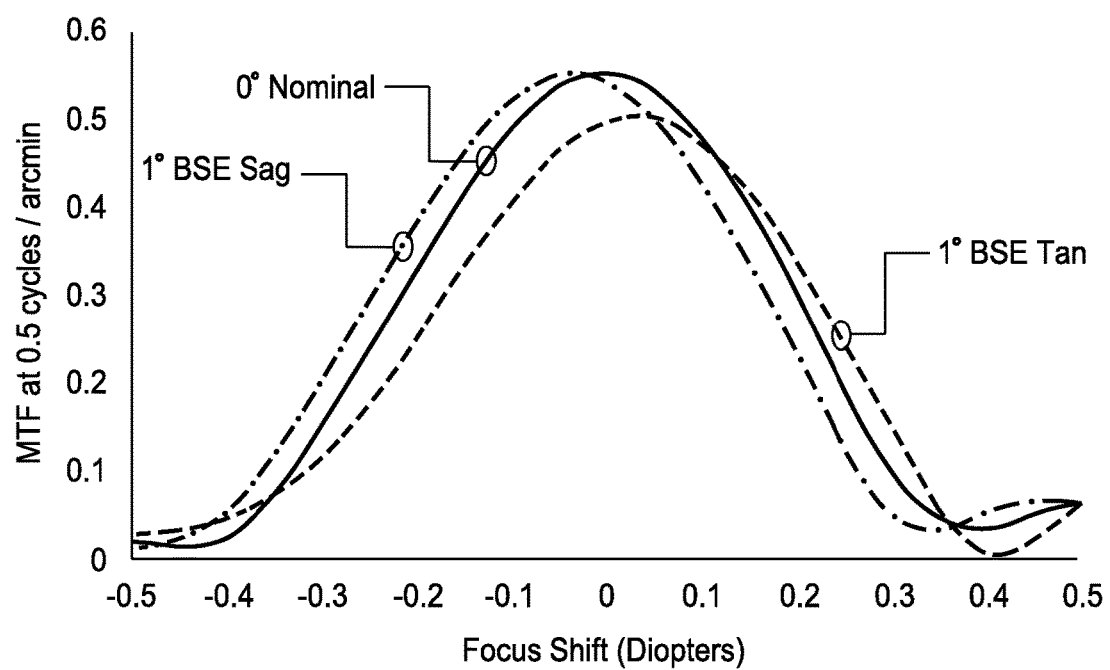
FIG. 6 is a graph showing modulation transfer function (at 0.5 cycles/arcmin) versus focus shift (diopters)

FIG. 6 illustrates the through-focus modulation transfer function for the 0° nominal design and the 1° boresight error corrected configurations analyzed at an afocal spatial frequency of 0.5 cycles per arcmin corresponding to the limit of visual acuity, typically cited as 1 arcmin resolved detail. In FIG. 6, the "Tan" and "Sag" labels refer to the tangential and sagittal planes of analysis. Loss of contrast following boresight error correction indicated by the modulation transfer function values are negligible considering the large margin to the threshold visual contrast in the nominal design, which is approximately 0.2 at 0.5 cycles per arcmin. In addition, the required accommodation of the eye to optimal focus on the point-of-impact following boresight error correction is less than 0.05 diopters and the astigmatism, characterized by the difference in Tan and Sag peak responses, is less than 0.1 diopters. Both values are negligible in view of the requirements for high performance visual optics.

Figure 7:
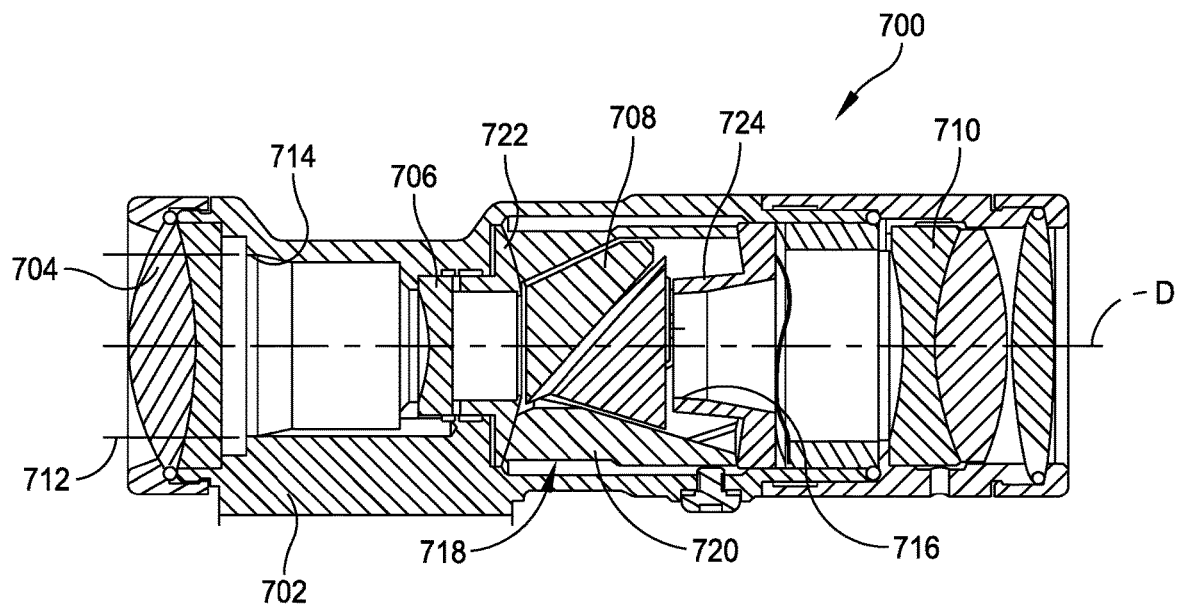
FIG. 7 is a cross-sectional view of an optical assembly of an embodiment of the present disclosure showing an inverting prism in a neutral position.
Figure 8:
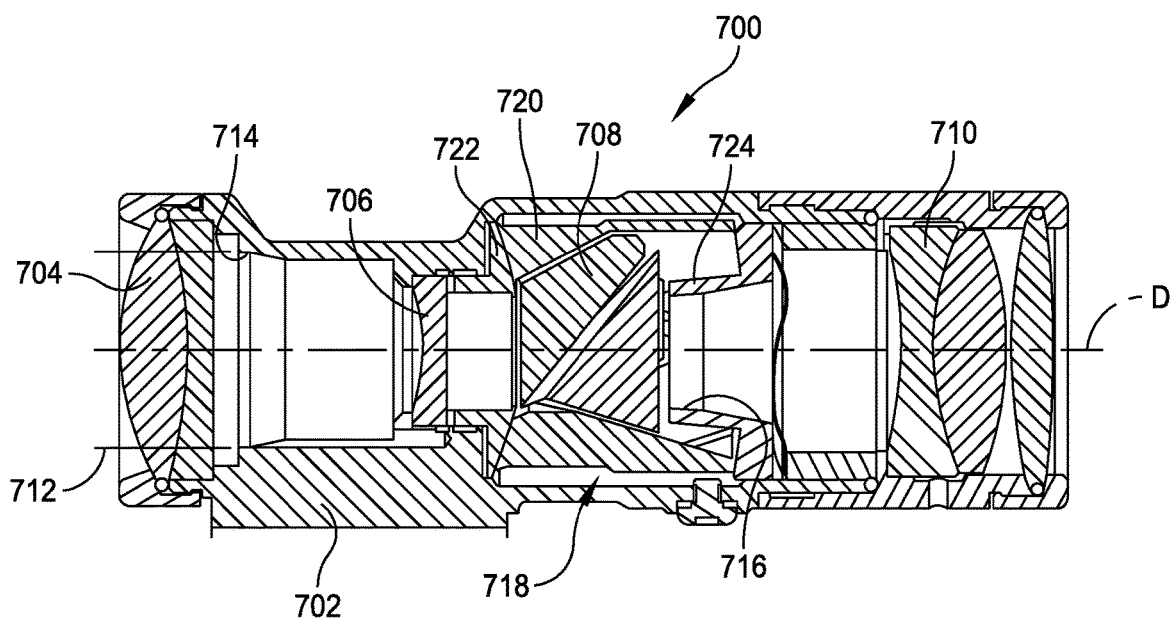
FIG. 8 is a cross-sectional view of the optical assembly of FIG. 7 showing the inverting prism pivoted about a center of an aperture stop.

Referring to FIGS. 7 and 8, an optical assembly is generally indicated at 700. As shown, the optical assembly 700 includes a support housing 702 that is designed to support the components of the optical assembly 700. The support housing 702 is generally cylindrical in construction and extends along an optical axis D. In one embodiment, the support housing 702 of the optical assembly is designed to support components of the optical system 500 illustrated in FIG. 5. Specifically, the optical assembly 700 includes a first lens assembly 704, a lens 706, an inverting prism assembly 708, and a second lens assembly 710. The arrangement is such that light reflected from a downrange object enters the optical assembly 700 along a plurality of field angles through the first lens assembly 704, which is configured to direct the light through an aperture stop 714. The light from the aperture stop 714 enters through the lens 706 to the inverting prism assembly 708, which is configured to manipulate the light and direct the light to a field stop 716. As shown, the inverting prism assembly 708 includes two prisms separated by an air gap. The light that enters the field stop 716 is directed toward the second lens assembly 710, which collimates the light along the respective field angles to an exit pupil (not shown) located along the optical axis D and separate from the support housing 702. The mechanical distance from the support housing 702 to the exit pupil location where the eye is positioned is known as the eye relief.

The optical assembly 700 further includes a mechanism, generally indicated at 718, configured to move the inverting prism assembly 708. Specifically, the mechanism 718 includes a prism mount cell 720 having surfaces configured to engage surfaces of the prisms of the image inverting prism assembly 708. The prism assembly 708 is housed and fixed in the prism mount cell 720, which can rotate with respect to the housing 702 by means of mechanism 718. The mechanism 718 further includes a front rotation actuator 722 and a rear rotation actuator 724 to move the prism mount cell 720 about a rotation point located at a center of the aperture stop 714 on the optical axis D. In one embodiment, the front rotation actuator 722 and the rear rotation actuator 724 are concentric spherical surfaces having a center of rotation at the aperture stop. The front rotation actuator 722 and the rear rotation actuator 724 is configured to move and stabilize the inverting prism assembly 708 in a desired, set position. FIG. 7 illustrates the inverting prism assembly 708 of the optical assembly 700 in a neutral position. FIG. 8 illustrates the inverting prism assembly 708 of the optical assembly 700 in a rotated, off-axis position. The mechanism 718 can be configured to rotate the prism cell mount 720 about the center of the aperture stop 714 a fixed, desired angle.

In one embodiment, an amount of rotation is approximately +/−0.75 degrees or 1.5 degrees total. A total field of view of the sight is approximately 5 degrees. An adjustment range is therefore about 30% to 40% of the total field of view.

Thus, it should be observed that in some embodiments of the present disclosure provide an optical design for a visual target sighting device having an image inverting prism that is pivoted about a point located on the optical axis for the purpose of effecting boresight error correction by such means as to make the point-of-impact and point-of-aim collinear with the optical axis.

In some embodiments, an optical design for a visual target sighting device having an image inverting prism that is pivoted about a point on the optical axis that has a constant, fixed relationship with respect to the aperture stop location.

In some embodiments, an optical design for a visual target sighting device having an image inverting prism that is pivoted about a point on the optical axis that has a fixed offset with respect to the aperture stop and that uses a telephoto objective lens arrangement to position the pivot point in the general location of the aperture stop.

In some embodiments, an optical design for a visual target sighting device having an image inverting prism that has a reticle pattern external to the inverting prism located at the focal plane of the objective.

In some embodiments, an optical design for a visual target sighting device having an image inverting prism that has a field stop external to the inverting prism located at the focal plane of the objective.

In some embodiments, a means of effecting boresight error correction in a visual sighting device that does not displace the exit pupil.

In some embodiments, a means of effecting boresight error correction in a visual sighting device that does not introduce vignetting.

In some embodiments, a means of effecting boresight error correction in a visual sighting device that does not require an increase to the clear apertures from those required to accommodate the nominal design.

In some embodiments, a means of effecting boresight error correction in a visual sighting device using an image inverting prism that is unconstrained in its location with respect to the focal plane of the objective.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

As used herein, the word "front" or "forward" corresponds to the direction of the sight magnifier assembly, "rear" or "rearward" or "back" corresponds to the direction opposite the direction of the sight magnifier assembly, "longitudinal" means the direction along or parallel to the longitudinal axis of the base, and "transverse" means a direction perpendicular to the longitudinal direction.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical system comprising:
    an aperture stop configured to direct light through the optical system;
    an inverting prism assembly configured to receive light from the aperture stop and direct light through the optical system;
    a field stop configured to receive light from the inverting prism assembly and direct light through the optical system to an operator of the optical system;
    at least one first lens configured to receive light from an object and direct light through the aperture stop and to the inverting prism assembly, the at least one first lens including an entrance lens positioned in front of the aperture stop and a lens positioned behind the aperture stop; and
    a mechanism configured to move the inverting prism assembly, the mechanism including a front rotation actuator and a rear rotation actuator to move the inverting prism assembly about a rotation point located at the aperture stop, the front rotation actuator and the rear rotation actuator being concentric spherical surfaces having a center of rotation at the aperture stop,
    wherein a point-of-impact is identified in object space and a point-of-aim is identified in afocal space of the optical system, the inverting prism assembly being configured to be pivoted about a center of the aperture stop to effect alignment of the point-of-impact and point-of-aim in the afocal space so that the point-of-aim is coincident with the optical axis, and
    wherein the inverting prism assembly includes two prisms separated by an air gap.

2. The optical system of claim 1, further comprising at least one second lens configured to receive light from the field stop and direct light to the operator of the optical system.

3. The optical system of claim 2, wherein the at least one second lens includes an eyepiece lens positioned behind the field stop.

4. The optical system of claim 2, further comprising a support housing configured to support the aperture stop, the at least one first lens, the inverting prism assembly, the field stop, and the at least one second lens.

5. The optical system of claim 4, wherein the support housing includes a generally cylindrical structure.

6. The optical system of claim 1, wherein the mechanism includes a prism mount cell having surfaces configured to engage surfaces of the inverting prism assembly.

7. The optical system of claim 6, wherein the prism mount cell is configured to rotate with respect to a support housing.

8. A method of aligning a point-of-impact and a point-of-aim of an optical system, the method comprising:
    directing light through an entrance lens to an aperture stop;
    directing light from the aperture stop through a lens to an inverting prism assembly;
    directing light from the inverting prism assembly through a field stop configured to direct light to an operator of the optical system; and
    pivoting the inverting prism assembly about a center of the aperture stop to effect alignment of the point-of-impact and point-of-aim in the afocal space so that the point-of-aim is coincident with the optical axis,
    wherein the inverting prism assembly includes two prisms separated by an air gap,
    wherein pivoting the inverting prism assembly is achieved by a mechanism configured to move the inverting prism assembly, and
    wherein the mechanism further includes a front rotation actuator and a rear rotation actuator to move the inverting prism assembly about a rotation point located at the aperture stop, the front rotation actuator and the rear rotation actuator being concentric spherical surfaces having a center of rotation at the aperture stop.

9. The method of claim 8, wherein a point-of-impact is identified in object space and a point-of-aim is identified in afocal space of the optical system.

10. The method of claim 9, further comprising directing light from an object through the aperture stop and to the inverting prism assembly.

11. The method of claim 10, further comprising directing light from the field stop to the operator of the optical system.

12. The method of claim 8, wherein the mechanism includes a prism mount cell having surfaces configured to engage surfaces of the inverting prism assembly.

13. The method of claim 12, wherein the prism mount cell is configured to rotate with respect to a support housing.

* * * * *